United States Patent [19]

Thuerig

[11] Patent Number: 5,445,419

[45] Date of Patent: Aug. 29, 1995

[54] SPLIT-RING BREAKAWAY CONNECTOR

[75] Inventor: Peter J. Thuerig, Brampton, Canada

[73] Assignee: Fuelmaker Corporation, Toronto, Canada

[21] Appl. No.: 80,011

[22] Filed: Oct. 1, 1993

[51] Int. Cl.⁶ .................................. F16L 37/084
[52] U.S. Cl. ............................. 285/1; 285/307
[58] Field of Search ............... 285/1, 2, 304, 307

[56] References Cited

U.S. PATENT DOCUMENTS

| | | | |
|---|---|---|---|
| 2,441,363 | 5/1948 | Krueger | 285/1 X |
| 2,511,765 | 6/1950 | Bradbury | 285/1 |
| 2,765,181 | 10/1956 | Butterfield | 285/304 X |
| 3,435,848 | 4/1969 | Johnston | 285/1 X |
| 4,348,039 | 9/1982 | Miller | 285/1 |
| 4,577,833 | 3/1986 | Bormioli | 285/1 X |

Primary Examiner—Dave W. Arola
Attorney, Agent, or Firm—David J. French

[57] ABSTRACT

A tension-activated disconnecting coupling operates by having a plug portion penetrate and pick-up an expandable locking ring. On partial with withdrawal of the plug, the locking ring is carried into a confining region where expansion of the ring is constrained and the plug is effectively locked within the coupling. Applied tension thereafter overcomes an internal spring resistance and allows the locking ring to move out further, into a space where it may expand and release the plug.

4 Claims, 4 Drawing Sheets

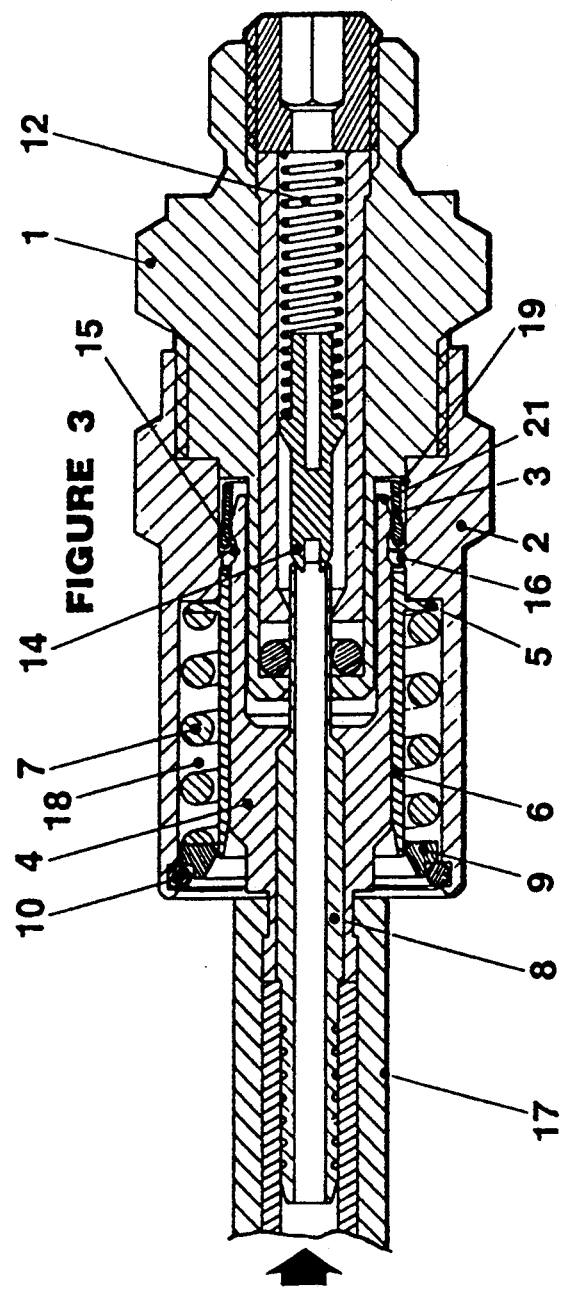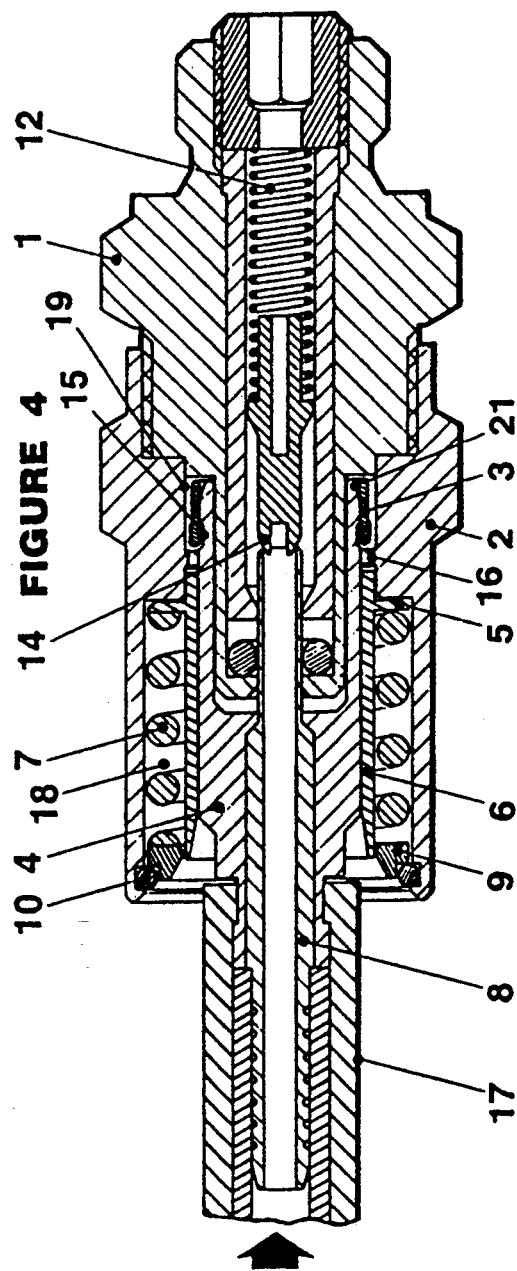

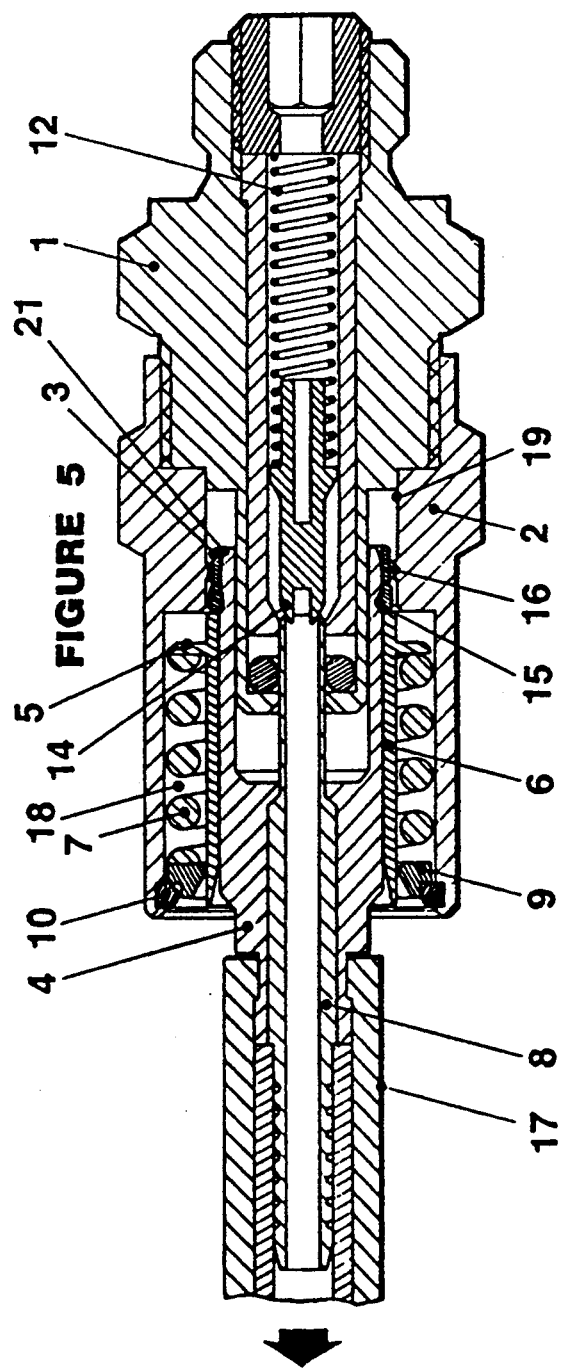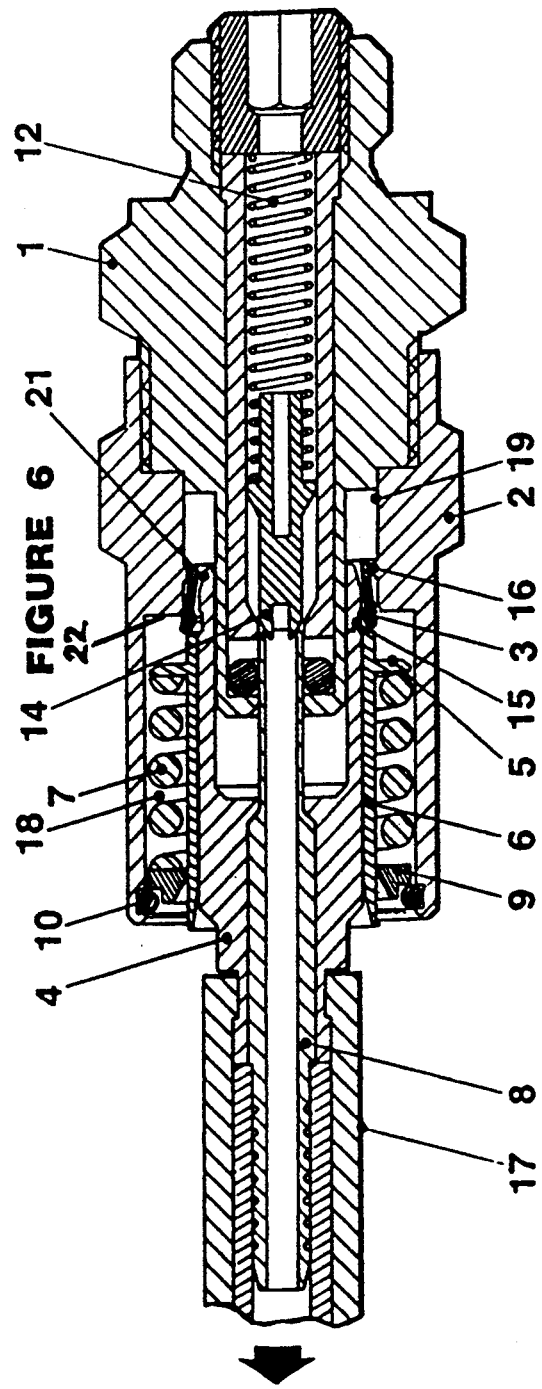

SPLIT-RING BREAKAWAY CONNECTOR

FIELD OF THE INVENTION

This invention relates to hose or line connectors which are intended to separate when stressed by a sufficient level of line tension. More particularly, this invention is applicable to pressurized lines that contain a check-valve to prevent the release of gases or liquids when the lines disconnect. It is equally applicable to connectors for other applications, such as electrical lines.

BACKGROUND OF THE INVENTION

Hose or line couplings that may be easily disconnected by a manual release means have been well studied in the art. Such manually releasable couplings generally rely upon the presence of a trapped ball or pawl. U.S. Pat. No. 2,521,701 to Earle et al is exemplary of this latter class of coupling.

In the Earle device an outer, moveable containment ring retains a ball in a locking position within a groove on a male plug until it is desired to disengage the connector. Manual displacement of the outer containment ring releases the ball from the groove and permits disengagement to occur.

An alternate version of a manually disengageable coupling is depicted in U.S. Pat. No. 3,782,840 to Brishka. In this case, a slotted, cylinder carries the interrupted segments of an annular bead that engages with a complimentary groove formed on a plug that is slid within the cylinder. Again, to effect release an outer containment sleeve must be displaced manually to free the cylinder-segments, permitting them to expand and allow the bead segments to withdraw from the groove.

U.S. Pat. No. 4,017,139 to Nelson for an improvement to the Brishka device contains a convenient exploded perspective view of these parts.

The present invention is based on a line connector that automatically disconnects under line tension, without the necessity for manual manipulation of the connector to effect release.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

The invention is based on a resilient cylindrical, expandable locking element such as a split-ring, loosely caged within the interior of the female portion or housing of a coupling. The male plug of the coupling, upon being manually inserted into the female portion, slides within, expands and penetrates the split-ring until the split-ring is advanced to the point where a portion of the split-ring nests within an annular groove on the outer surface of the male plug. This occurs within an inner expansion chamber portion of the female housing that permits expansion of the split ring, sufficiently for it to be penetrated by the male plug. The split-ring, in nesting within the groove on the plug, contracts slightly and is thereby displaceably locked in place.

The male plug, may be elastically biased by a spring means within the female housing to withdraw from the female housing and carry the split-ring seated in the groove back with it, as it commences to withdraw. This draws the split-ring and groove into a confining portion or containment chamber within the female housing wherein the split-ring is contained against expansion. In this contained condition, the split-ring is now substantially non-detachably locked within the groove.

Upon further retraction of the male plug from the female housing, the confined split-ring abuts against a spring-loaded tension sleeve that resists the further withdrawal of the split-ring. Upon application of increasing force, the tension sleeve eventually resiles and allows the plug to carry the split-ring within its groove out of the confining portion of the female housing and into a further releasing chamber within the female housing wherein the split-ring may once again expand, By reason of the continuing force applied to the split-ring by the tension sleeve, the split-ring expands and slides out of the groove formed on the male plug. The male plug may then withdraw freely under the line tension that is causing the connector to separate.

The tension sleeve will then advance to a stop that positions it adjacent to the containment chamber within the female housing, advancing the split-ring before it. The split-ring may either remain within the containment chamber until reinsertion of the male plug displaces it into the expansion chamber, or it may fall into such latter chamber due to casual handling of the female housing. Once in the expansion chamber, the split-ring is confined to the extent that it is maintained in approximate axial alignment with the connector and is therefore positioned for re-penetration by the plug.

The concept for this class of self-releasing connector is somewhat similar to the principle of a coconut monkey trap. In this traditional trap a hollowed-out coconut with a small access hole is fastened to the ground. A banana or other large fruit is placed inside. When a monkey discovers this bait, it reaches inside the coconut through the small opening, and grasps the fruit. As long as the monkey retains his grip on the fruit, his paw is too large to be withdrawn through the small opening. Strangely, the monkey will persist in retaining its grip on the fruit, even when it hears the sounds of humans approaching.

The analogy in the present device is that the split-ring cannot release its grip on the male plug until it has moved out of the containment chamber. This it can do only when line tension is sufficient to displace the tension sleeve and allow the split-ring to enter the releasing chamber. The fruit, so to speak, is then left behind within the trap.

A key feature of the present invention is that the strength of the spring biasing the tension sleeve may be selected so as to allow disengagement of the coupling at a desired preselected level of line tension.

This invention has applications wherever it is desired to provide an automatic tension activated coupling for a line. This includes not only fluid conduits but also electrical lines.

The foregoing summarizes the principal features of the invention. The invention may be further understood by the description of the preferred embodiments, in conjunction with the drawings, which now follow.

SUMMARY OF THE FIGURES

FIG. 3 shows the plug within the female housing as the split-ring is first being penetrated;

FIG. 4 shows the plug with the split-ring seated in place within the groove on the plug, before withdrawal of the split-ring into the containment chamber;

FIG. 5 shows the coupling with the split-ring confined within the containment chamber and abutting against the tension sleeve;

FIG. 6 shows the split-ring as it expands upon entering the release chamber, when the male plug is freed for separation from the coupling;

DESCRIPTION OF THE PREFERRED EMBODIMENTS

Figure 2:
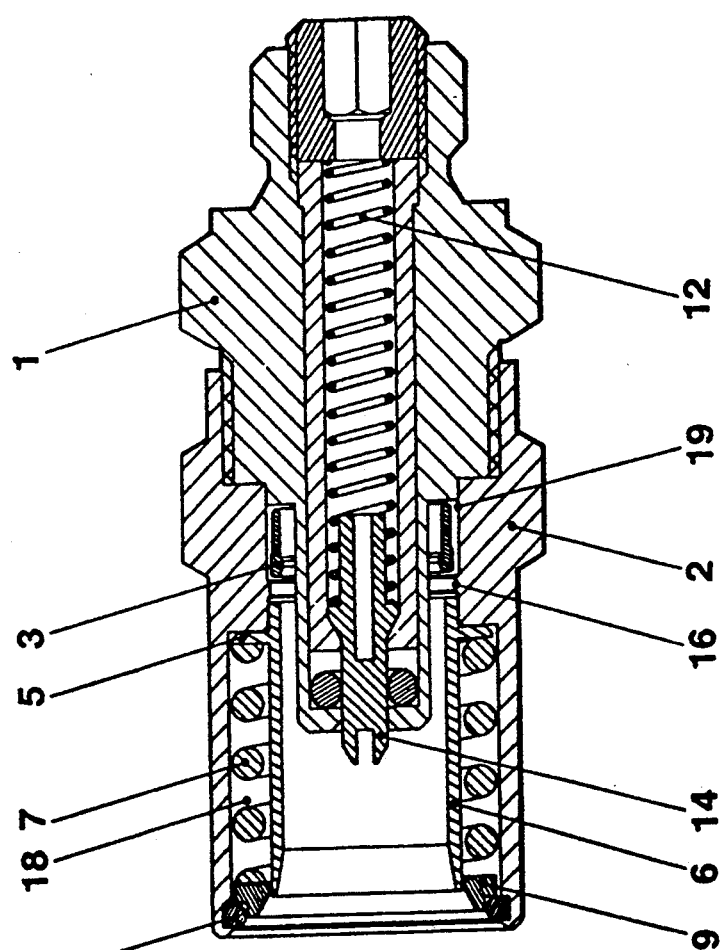
FIG. 2 is a cross-section of a female housing portion of the coupling.
Figure 1:
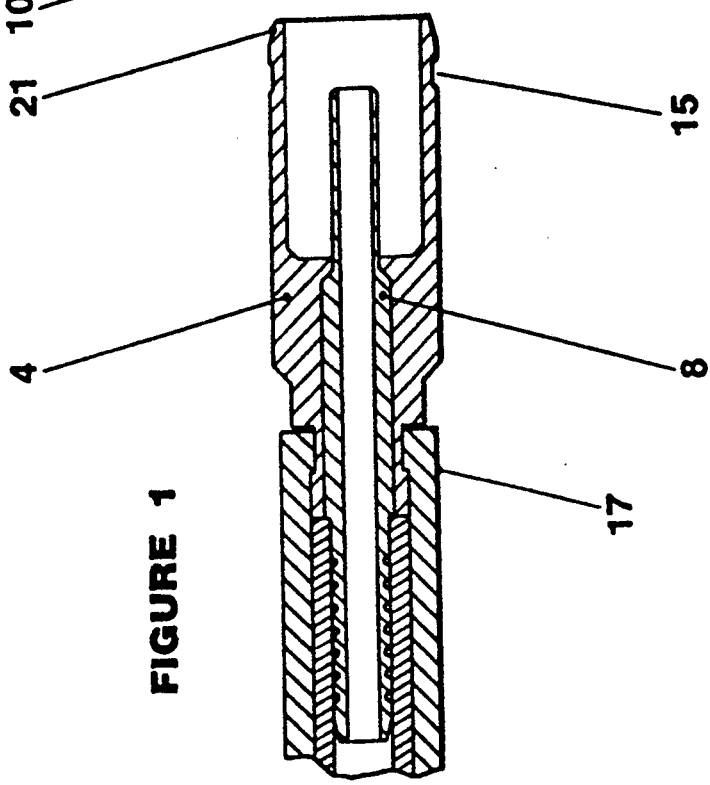
FIG. 1 is a cross-section of a male plug with external groove.

In FIG. 1 a male plug 4 connected to a hose 17 is provided with a groove 15, and an inner probe 8. This inner probe 8 engages with a check valve plug 14, required where the hose is to carry high pressure gas or the like.

The check valve 14 is contained within the female portion 1 of the coupling which provides a female housing 2 for its components. This housing 2 has an expansion chamber 19 within which is positioned a split-ring 3, having at one end a bead formed on its inside surface. The housing 2 is also provided with a containment region or containment chamber 16, and a release chamber 18.

As shown in FIGS. 3 and 4, upon entry into the female housing 2, the plug 4 penetrates the split-ring 3 which expands and slides over the end 21 of the plug, advancing until its bead-end engages with the groove 15 on the plug 4. This action is effected by the application of manual force to effect connection of the coupling.

Upon manual release of the coupling, the spring 12 within the check valve 14 biases the plug 4 to withdraw. In doing so it carries the split-ring 3 with it until the split-ring 3 is within the containment chamber 16 (FIG. 5).

At the end of this chamber 16, the split-ring 3 abuts against the end of a tension sleeve 6 held in place by a tension sleeve spring 7. Until this spring 7 is compressed, the split-ring 3 cannot be further withdrawn. And so long as the split-ring 3 it is within the containment chamber 16, the plug 4 is retained within the coupling as well.

Upon application of tension to the connector, the spring 7 is compressed. This allows the split-ring 3 to advance into the release chamber 18 (FIG. 6) where it is permitted to expand. The force applied to the split ring 3, together with its bevelled interface with the groove 15, causes the split-ring 3 to expand, releasing the male plug 4.

The split-ring 3 is then able to contract, re-enter the containment chamber 19 under the biasing force of the tension sleeve 5, to remain there or pass through by casual manipulation of the female housing 2 into the expansion chamber 19.

Figure 7:
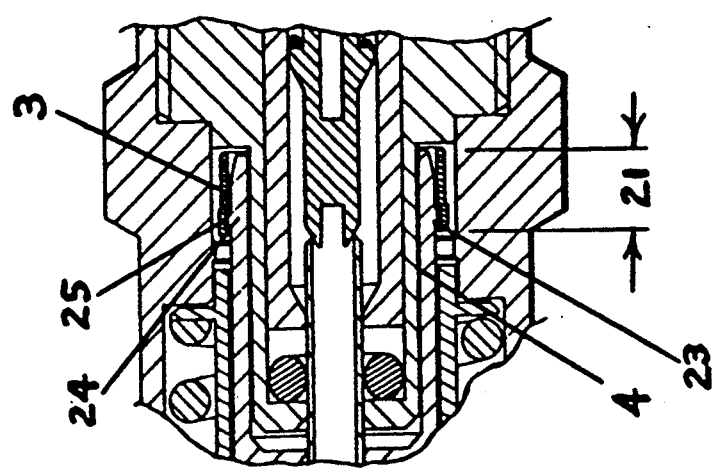
FIG. 7 shows an alternate engagement arrangement wherein the expandable locking means is provided with an inner recess that engages with bead elements formed on the outside of the plug.

The ring 3, shown in detail in FIG. 7 is preferably cylindrical, having an axial dimension 21 of sufficient length to maintain it in approximate axial alignment within the coupling, when positioned within any of the internal chambers. This length 21 is also sufficient to advance the split-ring 3 along the plug 4 until it engages with the groove 15.

The tension sleeve 6 has a stopping plate 5 which abuts against a wall 22 at one end of the release chamber 18 in order to limit the entry of the sleeve 6 into the containment chamber 16.

At the opposite end of the sleeve 6, the spring 7 seats against a washer 9 held in place by an expansion ring 10.

The parts are all made of suitable materials, preferably a corrosion-resistant metal such as stainless steel. The split-ring 3 should preferably be made of a hard resilient material, again such as stainless steel.

Figure 8:
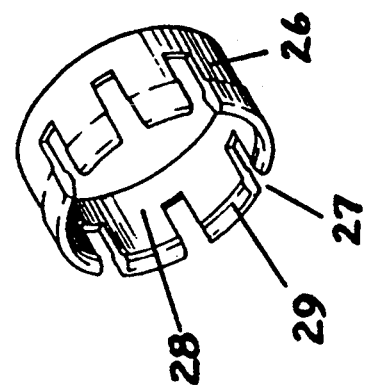
FIG. 8 shows a perspective view of an expandable locking means in the form of a segmented cylinder.

The split-ring need not be truly split, so long as it has expandable elements such as the segmented beaded portions depicted in FIG. 7 of U.S. Pat. No. 4,017,139. FIG. 8 of this present disclosure shows an adaptation of this segmented cylinder for use in the present invention.

In FIG. 8, a cylindrical sleeve 26 is interrupted by slots 27 forming segmented cylinder portions 28. On the inner sides of these segmented portions 28 are bead elements 29 suited for engagement with the groove 15 on the plug 4 or with depressions formed on the plug 4 that perform equivalently as "groove means". Thus this segmented sleeve 26 or cylindrical expandable locking element may serve equivalently to the split-ring 3 as an expandable locking means.

FIG. 7 depicts a reversed engagement arrangement whereby a rib 24 or bead with bevelled edges 23 is formed on the plug 4 and the split-ring 3 has an inner groove 25 which allows it to slide onto and off of the plug 4. Such a reversed configuration may also be applied to the cylindrical expandable locking element of FIG. 8.

CONCLUSION

The foregoing has constituted a description of specific embodiments showing how the invention may be applied and put into use. These embodiments are only exemplary. The invention in its broadest, and more specific aspects, is further described and defined in the claims which now follow.

The embodiments of the invention in which an exclusive property or privilege is claimed are defined as follows:

1. A tension activated connector having a male portion and a female portion, the male portion being provided with a plug having engagement means on its surface, the female portion providing a housing containing:

(1) an expansion chamber;
(2) a containment chamber adjacent to and aligned with said expansion chamber;
(3) a release chamber adjacent to and aligned with said containment chamber;
(4) a tension sleeve located within the release chamber and biased by tension spring means to advance towards a stop surface at the end of the release chamber adjacent the containment chamber; and
(5) a cylindrical expandable locking means located within the expansion chamber and re-locatable by displacement to fit within the containment chamber, said locking means being provided with an inner surface shaped for displaceable inter-engagement with the engagement means on the plug, locking engagement with said plug occurring when the expandable locking means is constrained from expanding, and dischargement therefrom occurring when said locking means becomes expanded, wherein the plug, on manual insertion into the housing will penetrate and advance within the expandable locking means until the inner surface of the locking means engages with the engagement means on the plug and thereafter, upon initial, partial withdrawal of the plug, carry the expandable locking means into the containment chamber wherein it is contained against expansion and abuts against the tension sleeve without disengagement from said plug, and wherein upon further application of tension between the male and female portions, the tension spring means will compress, allowing the expandable locking means to advance into the release chamber whereby such locking means expands to release the plug for withdrawal from the coupling.

2. A tension activated connector as in claim 1 further comprising a retraction spring means seated on said housing and axially aligned with said containment chamber and with said plug to initially bias the plug on insertion into the female housing towards withdrawal therefrom.

3. A tension activated connector as in claim 1 wherein the expandable locking means is a cylindrical split-ring.

4. A tension activated connector as in claim 1 wherein the expandable locking means comprises a cylindrical sleeve that is provided with segmented portions at one end that are shaped on their inner surfaces for inter-engagement with the engagement means on the plug.

* * * * *